(12) United States Patent
Jones et al.

(10) Patent No.: US 8,240,223 B2
(45) Date of Patent: Aug. 14, 2012

(54) ACTUATOR ARRANGEMENT

(75) Inventors: Tony Jones, Birmingham (GB); Stephen Harlow Davies, Shifnal (GB)

(73) Assignee: Goodrich Actuation Systems Limited, Solihull (GB)

( * ) Notice: Subject to any disclaimer, the term of this patent is extended or adjusted under 35 U.S.C. 154(b) by 849 days.

(21) Appl. No.: 12/046,816

(22) Filed: Mar. 12, 2008

(65) Prior Publication Data

US 2008/0229851 A1    Sep. 25, 2008

(30) Foreign Application Priority Data

Mar. 20, 2007  (GB) .................................. 0705301.0

(51) Int. Cl.
*F16H 27/02* (2006.01)
*F16H 57/00* (2006.01)
*F02K 1/54* (2006.01)
*F16D 9/00* (2006.01)

(52) U.S. Cl. ................ 74/89.26; 74/405; 244/110 B; 464/32

(58) Field of Classification Search ............. 74/89.23, 74/89.28, 89.33, 89.39, 89.26, 405, 411; 244/110 B; 60/226.2; 464/32
See application file for complete search history.

(56) References Cited

U.S. PATENT DOCUMENTS

| | | | | |
|---|---|---|---|---|
| 2,289,785 A * | 7/1942 | Hutchison, Jr. | ............... | 411/378 |
| 2,809,736 A * | 10/1957 | Hoover | ..................... | 192/143 |
| 3,071,945 A * | 1/1963 | Shomo | ........................ | 464/33 |
| 3,180,095 A * | 4/1965 | Schneider | ..................... | 60/343 |
| 4,179,944 A * | 12/1979 | Conner | ..................... | 74/89.26 |
| 4,688,744 A * | 8/1987 | Aldrich | ..................... | 244/99.9 |
| 4,971,267 A * | 11/1990 | Fulton et al. | ............... | 244/99.9 |
| 4,994,660 A * | 2/1991 | Hauer | ....................... | 239/265.41 |
| 5,456,439 A * | 10/1995 | Gauger | ....................... | 248/429 |
| 5,501,119 A * | 3/1996 | Yanagisawa | ............... | 74/490.09 |
| 5,548,954 A * | 8/1996 | de Cambray et al. | ..... | 60/226.2 |
| 5,630,490 A * | 5/1997 | Hudson et al. | ............. | 192/223.3 |
| 5,791,622 A * | 8/1998 | Gauger | ....................... | 248/430 |
| 6,050,522 A * | 4/2000 | Brossier et al. | ........... | 244/110 B |
| 6,094,908 A * | 8/2000 | Baudu et al. | ............... | 60/226.2 |
| 6,167,694 B1 * | 1/2001 | Davies | ......................... | 60/226.2 |
| 6,389,917 B1 * | 5/2002 | Oberle | ....................... | 74/412 TA |
| 6,666,307 B1 * | 12/2003 | Christensen | ................ | 188/134 |
| 6,786,315 B1 * | 9/2004 | Christensen | ................ | 192/48.7 |
| 6,810,656 B2 * | 11/2004 | Kortum et al. | ............. | 60/226.2 |
| 6,848,651 B2 * | 2/2005 | Christensen | ................ | 244/110 B |

(Continued)

FOREIGN PATENT DOCUMENTS

EP    0727594    8/1996

(Continued)

OTHER PUBLICATIONS

European Search Report dated Oct. 19, 2009.

*Primary Examiner* — Justin Krause
*Assistant Examiner* — Adam D Rogers
(74) *Attorney, Agent, or Firm* — Andrus, Sceales, Starke & Sawall, LLP

(57) ABSTRACT

An actuator arrangement comprises a pair of symmetrically loaded screw actuators driven from a common motor through respective drive shafts, and a protection arrangement arranged to avoid the continued application of full motor drive to one of the actuators in the event of the occurrence of a jam condition associated therewith.

7 Claims, 2 Drawing Sheets

U.S. PATENT DOCUMENTS

Figure 1:
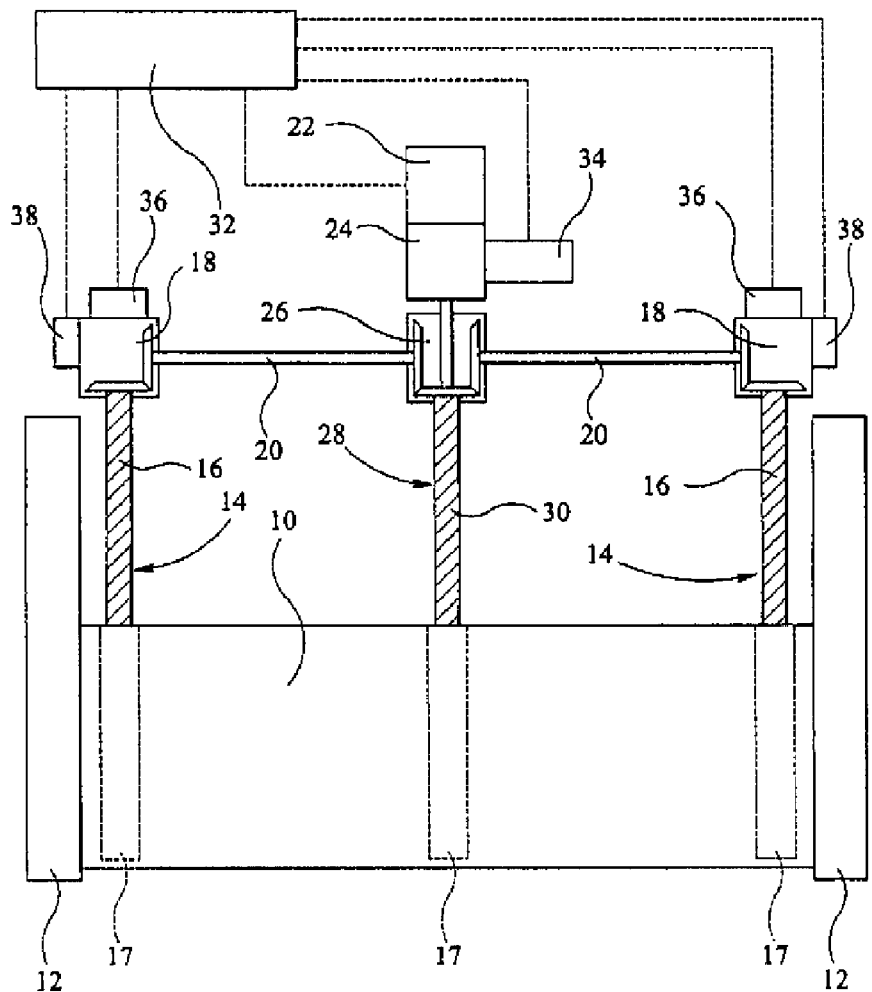

| | | | |
|---|---|---|---|
| 6,926,234 B2 * | 8/2005 | Colotte et al. | 244/110 B |
| 6,935,097 B2 * | 8/2005 | Eschborn | 60/226.2 |
| 6,976,352 B2 * | 12/2005 | Lair | 60/226.2 |
| 7,435,180 B2 * | 10/2008 | Kruegel et al. | 464/52 |
| 7,464,896 B2 * | 12/2008 | Carl et al. | 244/99.2 |
| 7,513,101 B2 * | 4/2009 | Eschborn et al. | 60/204 |
| 7,834,494 B2 * | 11/2010 | Blanding et al. | 310/68 B |

FOREIGN PATENT DOCUMENTS

| | | |
|---|---|---|
| GB | 2126177 | 3/1984 |
| WO | 2004113707 | 12/2004 |

\* cited by examiner

ACTUATOR ARRANGEMENT

This invention relates to an actuator arrangement, and in particular to an actuator arrangement suitable for use in driving and controlling the movement of an aircraft thrust reverser cowl.

One form of aircraft thrust reverser includes a pair of generally semi-cylindrical thrust reverser cowls that are translatable between stowed and deployed positions. Each cowl is driven, in use, by a plurality of linear actuators. The actuators commonly used to drive the thrust reverser cowls are hydraulically operated. An acme screw driven synchronisation arrangement is used to ensure that all of the actuators associated with each cowl are driven simultaneously at the same speed. The cowls are supported and guided for movement at their outer edges by guide tracks to resist twisting thereof, in use. There is a potential fault condition, with such arrangements, that the cowl may become jammed at one of its edges, thus preventing further movement of the cowl.

There is a requirement to reduce the weight of such arrangements and it is considered desirable to use electrically powered actuators in substitution for heavier conventional hydraulic actuators to drive the cowls between their stowed and deployed positions. In one contemplated arrangement, a single motor is used to drive a plurality of screw threaded actuators, for example ball or roller screw actuators, via a suitable gear arrangement and a series of drive shafts. The arrangement is such that the loadings experienced by at least two of the actuators are symmetrical. In such an arrangement the drive shafts not only serve to transmit power to the actuators, but also serve as a synchronisation arrangement, ensuring that the actuators are driven simultaneously at the same speed. The stroke length of the actuators is typically of the order of 1 m, and each actuator is moved from its stowed position to its deployed position in around 2 seconds.

The aerodynamic forces on the cowls, in use, are typically such that once the actuators have commenced movement to drive the cowls from their stowed positions towards their deployed positions, the applied aerodynamic forces will tend to urge the cowls towards their deployed positions and, during this phase of the operation of the thrust reverser, the motor and actuators serve to control or restrict the rate of movement of the cowls.

If one edge of the cowl becomes jammed, the adjacent one of the actuators will lag behind the other actuators, and the drive shaft/synchronisation arrangement will operate to apply the full motor force to that one of the actuators. Further, the aerodynamically applied forces experienced by the cowl and transmitted to at least one of the other actuators will also be transmitted to the jammed actuator through the drive shafts, thus substantially the full force of the aerodynamic forces experienced by the cowl will be transmitted to the actuator adjacent the jammed part of the cowl. The magnitude of the loading experienced by that actuator in these circumstances may be sufficiently high that damage may be caused to that actuator, for example the screw shaft thereof may become buckled. Obviously, this is undesirable.

In known hydraulically driven arrangements, the risk of damage occurring in such circumstances is somewhat lower as the hydraulic actuators are generally relatively robust, and also because the inefficient nature of the synchronisation arrangements used in such applications, which do not also serve as drive shafts, tend to transmit little, if any, of the aerodynamically induced forces from the cowl to the actuator adjacent the jammed part of the cowl.

It is desirable to be able to prevent damage to the actuators from occurring in the event of a jam without substantially increasing the size or weight of the actuators, and an object of the invention is to provide an actuator arrangement in which the likelihood of the occurrence of such damage is reduced.

According to the present invention there is provided an actuator arrangement comprising a pair of symmetrically loaded screw actuators driven from a common motor through respective drive shafts, and a protection arrangement arranged to avoid the continued drive of one of the actuators in the event of the occurrence of a jam condition associated therewith.

It will be appreciated that by interrupting or stopping the application of drive to an actuator unable to move due to a jam condition, the risk of causing damage thereto is reduced.

The protection arrangement may include a monitoring arrangement operative to monitor for the occurrence of a jam condition.

It will be appreciated that the production of a signal indicative of the occurrence of a jam condition can be used by an associated control arrangement to switch off drive to the motor and/or take other action to reduce the risk of damage to the actuator which is unable to move from occurring.

In one arrangement the monitoring arrangement comprises sensors associated with each of the actuators and arranged to output signals indicative of the statuses of the actuators, a difference in the outputs of the sensors associated with the actuators greater than a predetermined difference being indicative of the occurrence of a jam condition.

The sensors could comprise rotary variable differential transformers (RVDTs) operable to permit sensing of the angle of the actuator screw shaft or the like. Alternatively, they may comprise Hall effect sensors or shaft encoders operable to allow the number of revolutions of the actuator screw shaft to be monitored.

The actuators may be provided with lock arrangements operable, under the control of a control unit, to lock the actuators against further movement in the event of a jam condition being sensed.

Alternatively, the monitoring arrangement may be sensitive to torsional movement of parts of the drive shafts relative to other parts thereof, such torsional movement being indicative of the occurrence of a jam condition.

In another arrangement, the motor is arranged to drive the drive shafts through a differential gearbox, the protection arrangement comprising a tie arrangement operable to resist relative rotation of the drive shafts in normal operation, the tie arrangement being arranged to permit such relative movement in the event of a torque greater than a predetermined level being applied thereto by the drive shafts, as occurs in a jam condition, whereby continued operation of the motor will apply drive solely or primarily to the actuator which is still able to move.

In any of these arrangements, one or more further actuators may be provided and arranged to be driven by the motor.

Figure 2:
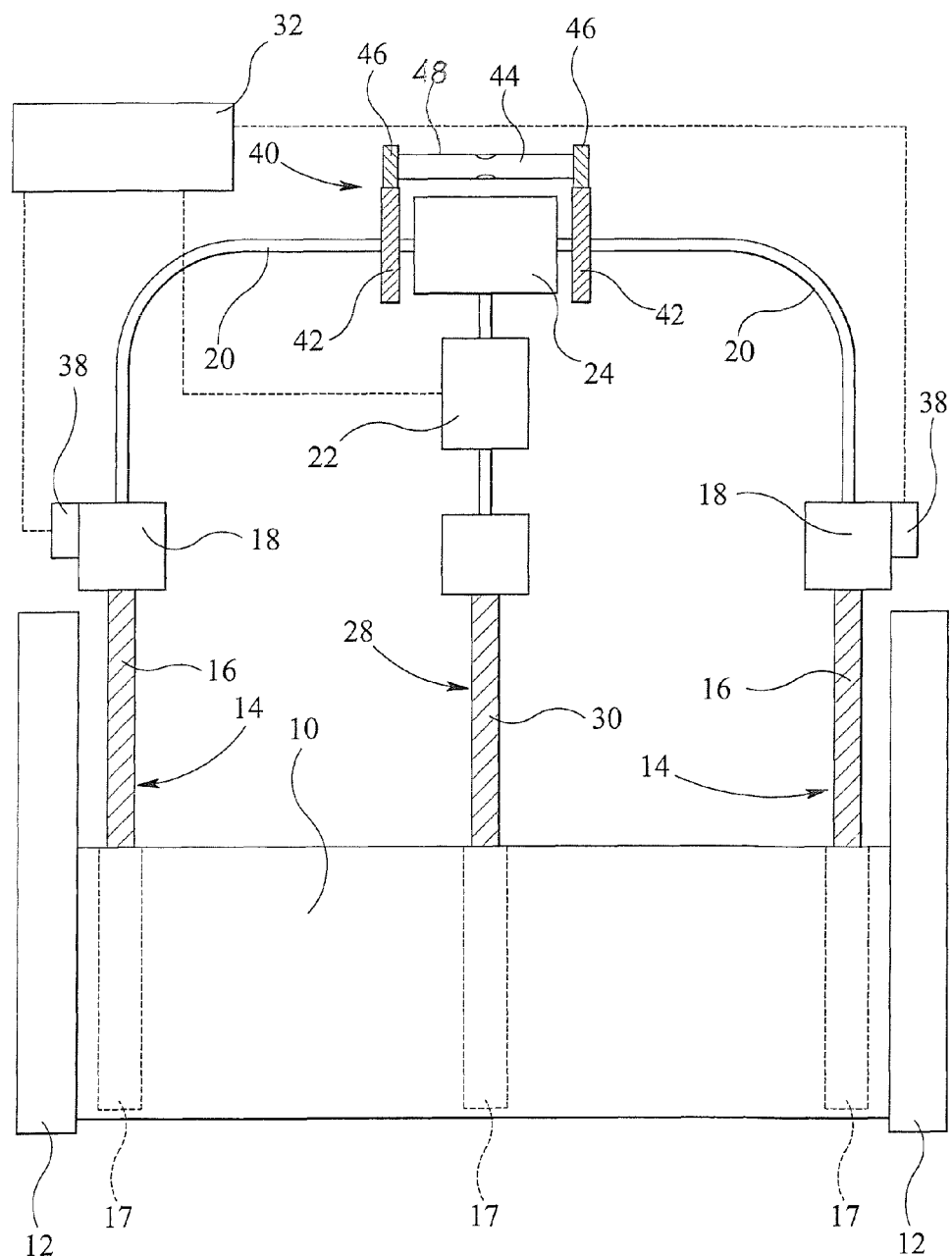

The invention will further be described, by way of example, with reference to the accompanying drawings, in which:

FIG. 1 is a diagrammatic view illustrating an actuator arrangement in accordance with one embodiment of the invention; and FIG. 2 is a diagrammatic view illustrating an alternative embodiment.

Referring firstly to FIG. 1 there is illustrated an actuator arrangement for use in driving a thrust reverser cowl 10 between stowed and deployed positions. The cowl 10 is supported at its edges by guide tracks 12 which support and serve to resist twisting of the cowl 10 in use. As illustrated, a pair of screw actuators 14 are used to drive the cowl 10 between its stowed and deployed positions, the screw actuators 14 being of the ball screw or roller screw type. The actuators 14 are located relatively close to the edges of the cowl 10, in the arrangement illustrated, but this need not always be the case.

Each actuator 14 includes a rotatable screw shaft 16 arranged to be driven through a gear arrangement 18 by a respective drive shaft 20, the drive shafts 20 being driven by an electrically powered motor 22 through a gearbox 24 and gear arrangement 26. The gear arrangements 18, 26 illustrated are very much simplified and in a practical arrangement would be designed to ensure that the screw shafts 16 of the actuators 14 are driven in the desired rotary directions at the same, desired rotary speed. The loadings experienced by the actuators 14 are symmetrical, and the drive paths from the motor 22 to the actuators 14 are identical in configuration and loading, although this need not always be the case and is not essential to the operation of the invention.

Also provided is a further actuator 28, the actuator 28 including a screw shaft 30 arranged to be driven from the gear arrangement 26, and hence to be driven by the motor 22. The further actuator 28 is designed to be extended at the same rate as the actuators 14. Each screw shaft 16, 30 is provided with a nut or sleeve 17 fixed against rotation and arranged to move axially along the screw shaft 16, 30 in response to rotation thereof, the nut or sleeve 17 of each actuator 14, 28 being attached, in conventional manner, to the cowl 10 for transmitting drive forces to the cowl 10.

An electronic thrust reverser actuator controller (ETRAC) 32 is arranged to control the operation of the motor 22 to control the deployment of the thrust reverser cowl 10. A linear variable differential transformer (LVDT) 34 driven from the gearbox 24 provides a feedback signal to the ETRAC 32 indicative of the position of the cowl 10. As the actuators 14, 28 are of fairly long stroke, typically approximately 1 m, it is impractical to use a full length LVDT to monitor cowl position so, instead, the LVDT 34 monitors a fine pitched screw driven from the gearbox 24.

The actuator arrangement is provided with a protection arrangement to reduce the risk of damage to one of the actuators 14 occurring in the event of a jam condition, the protection arrangement being provided by monitoring for the occurrence of a jam condition and taking action to reduce the risk of damage in the event that a jam condition is sensed. This is achieved by providing each of the actuators 14 with a sensor in the form of an RVDT 36, the output of which is indicative of the angle of the screw shaft 16 associated therewith. The output signals from the RVDTs 36 are compared with one another by the ETRAC 32. Any difference between the outputs of the RVDTs 36 greater than a predetermined threshold is indicative of a jam condition having occurred at a part of the cowl adjacent one or other of the actuators 14, preventing further movement of that one of the actuators 14.

In normal use, the ETRAC 32 controls the operation of the motor 22 to drive the actuators 14, 28, and hence the cowl 10 between its stowed and deployed positions. As the loadings experienced by the actuators 14 are symmetrical, and the actuators 14, 28 extend at the same rate, in normal use the outputs of the RVDTs 36 will be identical to one another or differ from one another by only a small amount less than a predetermined threshold. As described hereinbefore, throughout much of the stroke of the actuators 14, deployment of the cowl 10 will be assisted by aiding aerodynamically applied forces and, during these parts of the deployment operation, the motor 22 may serve primarily to brake or otherwise control deployment, rather than to drive the actuators 14. In the event that part of the cowl 10 becomes jammed, the adjacent one of the actuators 14 will be unable to continue to operate, and the continued operation of the other actuator will cause the drive shafts 20 to twist or 'wind up', accommodating a small amount difference in the positions of the actuators 14. This difference will result in a difference in the outputs of the RVDTs 36. The difference in the sensor outputs, as determined by the ETRAC 32, will quickly rise beyond the predetermined threshold, providing an indication that a jam condition has arisen. Upon determining that a jam condition has arisen, the ETRAC 32 terminates the operation of the motor 22, thereby removing the motor loading applied to the actuators 14 and so reducing the risk of damage to the actuator 14 adjacent the jammed part of the cowl 10 occurring. It will be appreciated that although the ETRAC 32 can terminate the motor applied drive to the actuators 14, aerodynamically applied forces will continue to be transmitted via the drive shafts 20 from the other actuators 14, 28 and, as described hereinbefore, these forces may themselves be sufficient to cause further damage.

In order to reduce the risk of aerodynamically applied forces causing damage, the actuator arrangement may further comprise lock or brake arrangements 38 operable under the control of the ETRAC 32 to lock the screw shafts 16 against further rotation. In the event of a jam condition being sensed, the ETRAC 32 operates the lock arrangements 38 to lock the screw shafts 16 against rotation. By locking the screw shafts 16 against rotation, aerodynamically applied forces experienced by the cowl and transmitted by the actuator 14 remote from the jammed part of the cowl 10 are no longer transmitted through the drive shafts 20 to the actuator 14 closest to the jam, and so the risk of aerodynamically applied forces causing damage to that actuator 14 is reduced.

Although the arrangement described hereinbefore makes use of RVDTs 36 to sense the angular positions of the screw shafts 16, it will be appreciated that other forms of sensor may be used. For example, extension of the actuators 14 could be sensed using LVDTs, or the rotation of the screw shafts 16 could be sensed using Hall effect sensors or other shaft encoders, for example optical arrangements, and associated control arrangements to monitor and compare the number of revolutions of the screw shaft. Such arrangements may permit recalibration of the sensor arrangement each time the actuator arrangement is returned to its fully stowed position.

Another possibility is to sense the occurrence of a jam condition by sensing relative torsional or twisting movement in the drive shafts 20 directly. It will be appreciated that, as mentioned hereinbefore, in the event of a jam condition occurring, the continued operation of the motor 22 and the application and transmission of aerodynamic forces will result in a degree of torsional or twisting movement of the drive shafts 20. By comparing the angular position of one end of each drive shaft with the angular position of the other end thereof, such movement can be sensed and, in the event that the movement exceeds a predetermined level, it can be used by the ETRAC 32 to provide an indication that a jam condition has arisen and to cease operation of the motor 22 (and apply the locks 38, if provided) to reduce the risk of actuator damage occurring. The sensing of such torsional or twisting movement may be achieved, for example, using feedback cables, rods or shafts associated with each end of each drive shaft 20 and a mechanical differential movement detector to sense relative movement and to trip a switch or suitable alternative sensor in the event that such relative movement occurs and exceeds a predetermined threshold.

The arrangements described hereinbefore all require the outputs of sensors to differ from one another by an amount greater than a predetermined threshold to determine that a jam condition has arisen and terminate motor operation.

FIG. 2 illustrates an arrangement which differs from that of FIG. 1 in that the gearbox 24 is a differential gearbox. The drive shafts 20 are illustrated as being of flexible form, but this need not always be the case. Rather than using sensors in the form of RVDTs 36 to sense the occurrence of a jam condition, the protection arrangement is provided by a tie arrangement 40 operative to resist relative angular movement between the drive shafts 20 by connecting the two outputs of the differential gearbox 24 together. The tie arrangement 40 comprises, in the arrangement illustrated, gears 42 provided on each of the drive shafts 20, and a tie bar 44 including gears 46 meshed with the gears 42. The tie bar 44 includes a friction brake 48, shear pin or other device operable such that, in the event that a torque greater than a predetermined level is applied across the tie bar 44, the tie bar 44 no longer operates to resist relative rotation of the drive shafts 20 and the differential gearbox 24 will be able to distribute forces unequally between the drive shafts 20.

In normal use, the ETRAC 32 controls the operation of the motor 22 such that the cowl 10 is moved along its guides 12 by the actuators 14 and further actuator 28 between its stowed and deployed positions, and the tie arrangement 40 operates to ensure that the actuators 14 are synchronised to one another. In the event of a jam condition, the continued operation of the motor 22 and the application of aerodynamic forces will result in a significant torque being applied across the tie bar 44 sufficient that the tie bar 44 can no longer operate to resist relative rotation of the drive shafts 20 and, in the case where the tie bar 44 is configured as a shear pin, will fail. The use of a differential gearbox 24 ensures that excessive torque from the motor or from aerodynamic loads experienced by the other actuator 14 are not transmitted to the actuator 14 adjacent the jammed part of the cowl 10 through the tie bar 44, thus the risk of damage being caused to the actuator 14 is minimised.

The continued operation of the motor 22 to drive the actuator 14 remote from the jammed part of the cowl 10 will result in the cowl 10 becoming skewed, and cowl position sensors or the like may be used to provide the ETRAC 32 with a signal indicative of such a condition. Upon determining that the cowl 10 has become skewed, the ETRAC 32 may stop operation of the motor 22 and apply lock arrangements 38 as described hereinbefore (if provided).

In this embodiment, the further actuator 28, if provided, is driven from a second output of the motor 22.

It will be appreciated that this embodiment is advantageous in that operation thereof to avoid damage to an actuator will occur immediately and automatically upon the application of an excessive differential load across the tie arrangement 40.

Although illustrated as being located externally of the gearbox 24, the tie arrangement 40 may be located internally and form part thereof, if desired.

In another arrangement, the differential gearbox 24 may be replaced by an actuator which is capable of sensing differential movement, internally, and which can either provide an electrical output or operate a mechanical brake in the event of a differential loading thereto. An actuator of this type is shown in U.S. Pat. No. 6,443,034.

It will be appreciated that the provision of a protection arrangement to reduce the risk of damage to the actuators in the event of a jam condition is advantageous in that the size and weight of a conventional hydraulic thrust reverser actuation system can be reduced, and functionality improved, by substituting electrically operated actuators without compromising the robustness of the thrust reverser system.

Although not illustrated or described hereinbefore, the thrust reverser arrangement will typically further include a conventional series of locks and sensors to ensure correct operation thereof.

A number of modifications and alterations to the arrangements described hereinbefore may be made without departing from the scope of the invention.

The invention claimed is:

1. An actuator arrangement comprising a pair of screw actuators driven from a common motor through respective drive shafts connected to respective outputs of a differential gearbox, and a protection arrangement comprising a tie arrangement connected across the outputs of the differential gearbox and to each corresponding respective driveshaft, wherein the tie arrangement is responsive to a difference in the torques applied to the drive shafts and arranged to avoid the continued application of drive to one of the screw actuators in the event of the occurrence of a jam condition associated with that one of the screw actuators, wherein the tie arrangement is operable to resist relative rotation of the drive shafts and ensure that the screw actuators are synchronized when the difference in the torques applied thereto is less than a predetermined level, and operable to permit such relative movement in the event of a torque difference greater than the predetermined level being applied thereto to avoid the continued application of drive to the said one of the screw actuators.

2. An arrangement according to claim 1, wherein the protection arrangement is responsive to torsional movement of parts of the drive shafts relative to other parts thereof, such torsional movement being indicative of the occurrence of a jam condition.

3. An arrangement according to claim 1, further comprising lock arrangements associated with the screw actuators and operable, under the control of a control unit, to lock the screw actuators against further movement in the event of a jam condition being sensed.

4. An arrangement according to claim 1, wherein the tie arrangement includes a friction brake.

5. An arrangement according to claim 1, wherein the tie arrangement includes a shear pin.

6. An arrangement according to claim 1, comprising one or more further screw actuators arranged to be driven by the motor.

7. An arrangement according to claim 1, wherein the screw actuators are substantially symmetrically loaded when operating correctly, in use, and said screw actuators are asymmetrically loaded in the event of a failure or jam.

\* \* \* \* \*